(12) United States Patent
Bickford et al.

(10) Patent No.: US 9,524,394 B2
(45) Date of Patent: *Dec. 20, 2016

(54) METHOD AND APPARATUS FOR PROVIDING PROVABLY SECURE USER INPUT/OUTPUT

(71) Applicant: AT&T Intellectual Property I, L.P., Atlanta, GA (US)

(72) Inventors: Jeffrey E. Bickford, Somerset, NJ (US); Mikhail Istomin, Brooklyn, NY (US); Evgene Vahlis, Mississauga (CA)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,613

(22) Filed: Nov. 23, 2015

(65) Prior Publication Data

US 2016/0085973 A1    Mar. 24, 2016

Related U.S. Application Data

(63) Continuation of application No. 13/540,073, filed on Jul. 2, 2012, now Pat. No. 9,195,838.

(51) Int. Cl.
| | |
|---|---|
| *G06F 21/60* | (2013.01) |
| *G06F 21/74* | (2013.01) |
| *H04W 12/06* | (2009.01) |
| *G06F 21/85* | (2013.01) |
| *G06F 21/82* | (2013.01) |
| *G06F 21/83* | (2013.01) |
| *G06F 21/44* | (2013.01) |

(52) U.S. Cl.
CPC .......... *G06F 21/606* (2013.01); *G06F 21/602* (2013.01); *G06F 21/74* (2013.01); *H04W 12/06* (2013.01); *G06F 21/445* (2013.01); *G06F 21/82* (2013.01); *G06F 21/83* (2013.01); *G06F 21/85* (2013.01)

(58) Field of Classification Search
CPC ...... G06F 21/606; G06F 21/602; G06F 21/85; G06F 21/82; G06F 21/83; G06F 21/74; G06F 21/445

See application file for complete search history.

(56) References Cited

U.S. PATENT DOCUMENTS

| | | | |
|---|---|---|---|
| 6,011,849 A | 1/2000 | Orrin | |
| 6,363,249 B1 | 3/2002 | Nordeman et al. | |
| 7,873,577 B1 | 1/2011 | Duhaime et al. | |
| 8,839,004 B1 * | 9/2014 | Bennett .............. | G06F 21/575 713/189 |
| 9,195,838 B2 | 11/2015 | Bickford et al. | |
| 2001/0044886 A1 | 11/2001 | Cassagnol et al. | |
| 2003/0072059 A1 | 4/2003 | Thomas et al. | |
| 2009/0013393 A1 | 1/2009 | Xi | |

\* cited by examiner

*Primary Examiner* — Jung Kim
*Assistant Examiner* — Ngoc D Nguyen

(57) ABSTRACT

A method, non-transitory computer readable medium and apparatus for securing user input and/or output on a mobile endpoint device. For example, the method receives an input on the mobile endpoint device, encrypts and authenticates the input in a trusted domain of the mobile endpoint device executing an application and sends the input that is encrypted and authenticated to an untrusted domain of the mobile endpoint device over a secure channel.

17 Claims, 4 Drawing Sheets

METHOD AND APPARATUS FOR PROVIDING PROVABLY SECURE USER INPUT/OUTPUT

This application is a continuation of U.S. patent application Ser. No. 13/540,073, filed Jul. 2, 2012, now U.S. Pat. No. 9,195,838, which is herein incorporated by reference in its entirety.

The present disclosure relates generally to mobile device security and, more particularly, to a method and apparatus for providing provably secure user input/output.

BACKGROUND

Modern smartphones are frequently compromised by malware, potentially accessing sensitive information stored on the device. Evidence has shown that the traditional approach to securing systems, where attackers find vulnerabilities and then security engineers fix them, is inadequate and provides an opportunity for attackers to cause significant damage before the vulnerability is fixed.

Attackers have become more sophisticated. An attacker can manage to completely compromise an operating system of a device by installing a kernel-level rootkit. By monitoring user input, an attacker with complete control of a device can easily obtain user credentials for sensitive applications such as mobile banking.

SUMMARY

In one embodiment, the present disclosure provides a method for securing user input and/or output on a mobile endpoint device. For example, the method receives an input on the mobile endpoint device, encrypts and authenticates the input in a trusted domain of the mobile endpoint device executing an application and sends the input that is encrypted and authenticated to an untrusted domain of the mobile endpoint device over a secure channel.

In another embodiment, the method receives data in an untrusted domain of the mobile endpoint device that is executing an application, sends the data to a trusted domain of the mobile endpoint device executing the application over a secure channel, decrypts and authenticates the data in the trusted domain of the application, and displays the data as the user output on a display of the mobile endpoint device.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for securing user input and output on a mobile endpoint device. Attackers have become more sophisticated. An attacker can manage to completely compromise an operating system of a device by installing a kernel-level rootkit. By monitoring user input, an attacker with complete control of a device can easily obtain user credentials for sensitive applications such as mobile banking. One embodiment of the present disclosure attempts to secure a user's input and output on a mobile endpoint device by separating the mobile endpoint device that executes an application into a trusted domain containing a user interface portion of the application and an untrusted domain containing a logic portion of the application.

Figure 1:
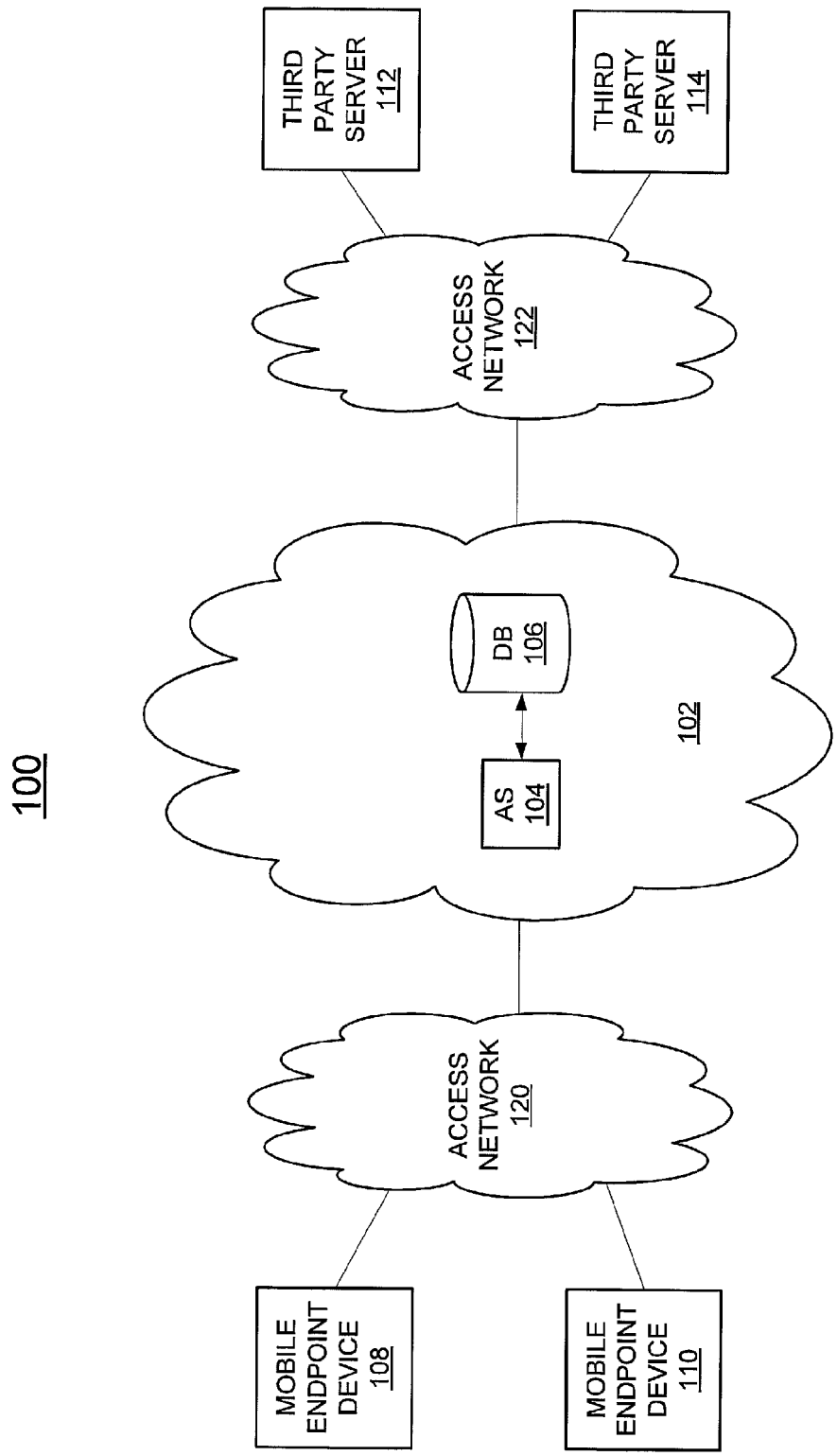
FIG. 1 illustrates one example of a communications network of the present disclosure.

FIG. 1 is a block diagram depicting one example of a communications network 100. The communications network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network, an asynchronous transfer mode (ATM) network, a wireless network, a cellular network (e.g., 2G, 3G, and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

In one embodiment, the access network 120 may be in communication with one or more mobile endpoint devices 108 and 110. In one embodiment, the endpoint device 108 may be a mobile endpoint device such as a cellular telephone, a smart phone, a tablet computer, a laptop computer, a netbook, a portable media device (e.g., an iPod® touch or MP3 player), and the like. Although only two mobile endpoint devices 108 and 110 are illustrated, it should be noted that any number of mobile endpoint devices may be deployed.

In one embodiment, the access network 122 may be in communication with one or more third party servers 112 and 114. In one embodiment, the third party servers 112 and 114 may be servers of third party service providers that may send and receive sensitive information to and from the mobile endpoint devices 108 and 110. For example, the third party service providers may be banks, financial institutions, online retailers, and the like. Although only two third party servers 112 and 114 are illustrated, it should be noted that any number of third party servers may be deployed.

It should be noted that the network 100 has been simplified. For example, the network 100 may include other network elements (not shown) such as border elements, routers, switches, policy servers, security devices, gateways, a content distribution network (CDN) and the like.

Figure 2:
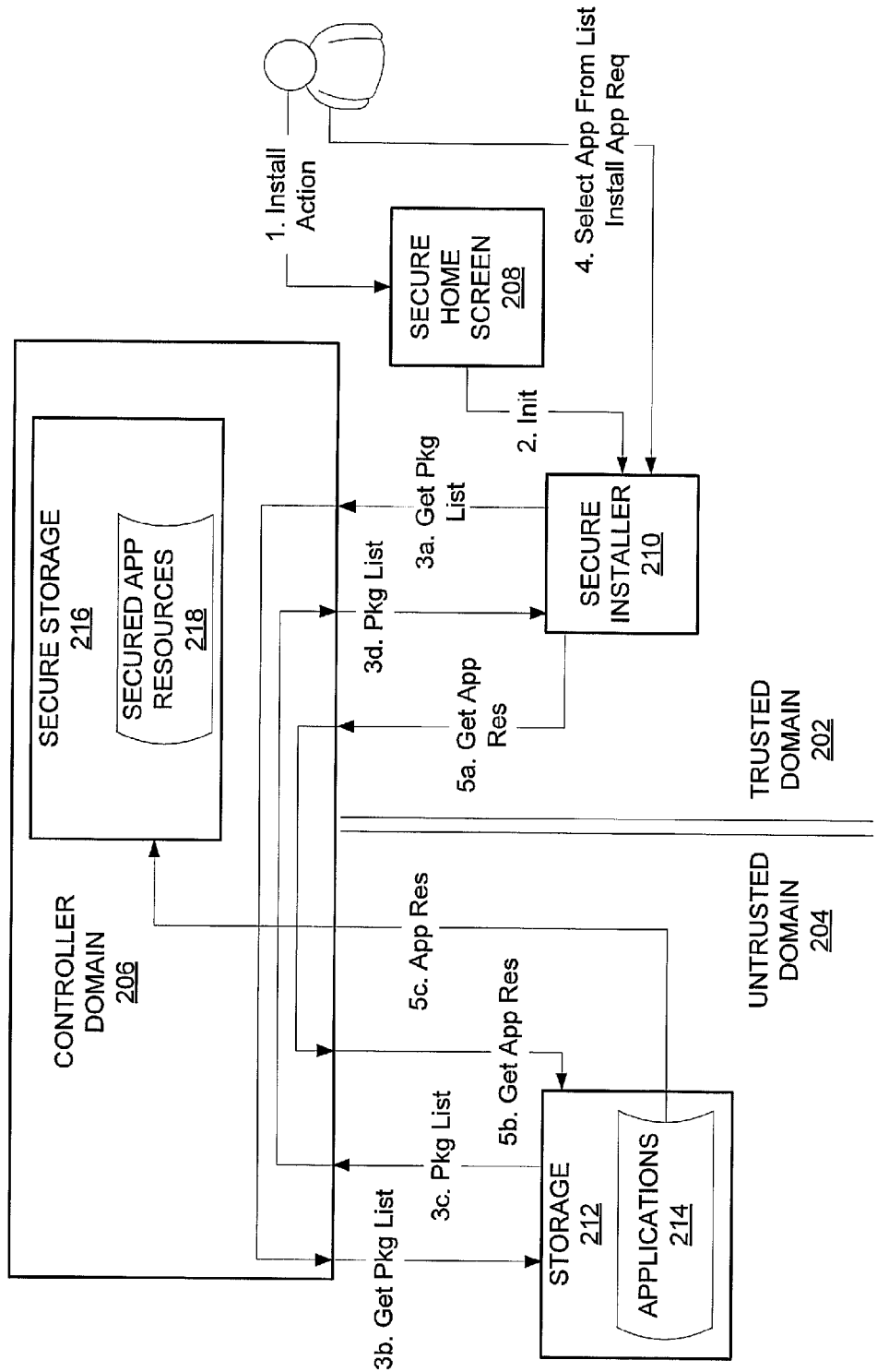
FIG. 2 illustrates an example flowchart of one embodiment of a method for installing an application on a mobile endpoint device.
Figure 4:
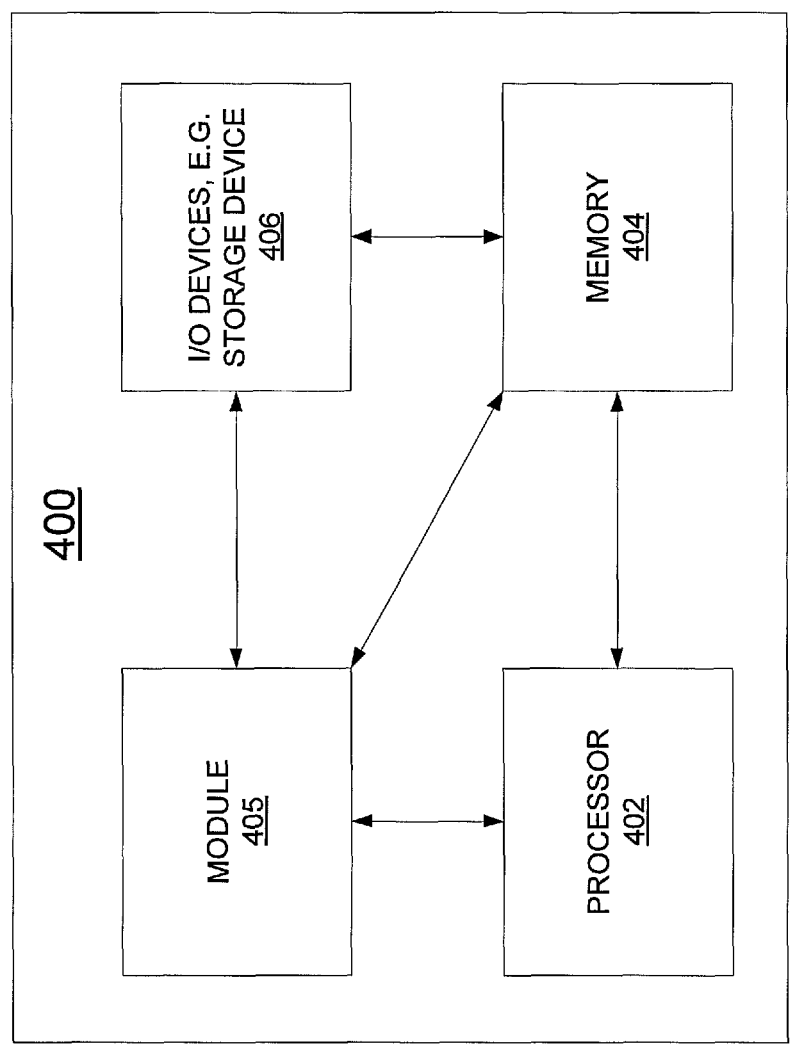
FIG. 4 illustrates a high-level block diagram of a general-purpose computer suitable for use in performing the functions described herein.

FIG. 2 illustrates an example flow chart of a method for installing an application on a mobile endpoint device, for example the mobile endpoint device 108. Namely, FIG. 2 illustrates one example of the present method relative to different domains to provide secure installation of the application. In one embodiment, one or more operations of the method of FIG. 2 may be performed by the endpoint device 108 (e.g., a processor of the mobile endpoint device) or a general purpose computing device as illustrated in FIG. 4 and discussed below.

In one embodiment, each application that is installed on the mobile endpoint device 108 may be split into different domains; namely a trusted domain 202 and an untrusted domain 204. The mobile endpoint device 108 may also include a controller domain 206. In one embodiment, the trusted domain 202 may also be referred to as a user interface (UI) domain. In one embodiment, the untrusted domain 204 may also be referred to as a user domain or a logical domain.

In one embodiment, by separating each application into these different domains, the input and outputs received by the UI in the trusted domain 202 is protected from potential attackers with the control of the untrusted domain 204. To guarantee integrity of the system, the trusted domain 202 has no communication with any external sources except through a formally verified secure channel.

In one embodiment, the trusted domain 202 includes a secure home screen 208 and a secure installer 210. In one embodiment, the untrusted domain 204 includes a storage medium 212 (e.g., memory and the like) that includes one or more applications 214. In one embodiment, the controller domain 206 includes a secure storage medium 216 (e.g., memory and the like) that includes one or more secured application resources 218.

In one embodiment, execution of the application in different domains does not require application programmers to change the way that the applications are conventionally developed. The application may be parsed to separate the application into the trusted domain 202 containing the UI portions of the application and the untrusted domain 204 containing the logic portions of the application. For example, a library of wrapper functions can be used to translate normal UI related calls within the untrusted domain 204 to their secure equivalent. Application layout files and resources can be automatically extracted from an application and used to display the UI within the trusted domain 202.

In one embodiment, any virtualization platform (e.g., open source or non-open source) may be used to isolate the application into the different domains. One example of an open source virtualization platform that may be used is Xen® hypervisor. In one embodiment, the trusted domain 202 and the untrusted domain 204 may be considered as two separate Xen virtual machines each running a full fledge version of the operating system (e.g., Android®) of the mobile endpoint device. The controller domain 206 may operate to control and manage both the trusted domain 202 and the untrusted domain 204.

In one embodiment, at step 1, the method receives an install action from a user. For example, the user may initiate the mobile endpoint device 108 to install a new application. The new application may be located on an external storage device, for example, such as secure digital (SD) memory card or an app store on a third party server. A hardware isolation layer, such as ARM TrustZone, can also be used to securely isolate each domain.

At step 2, the secure home screen 208 may initialize a secure installer 210. For example, a controller physical home button may be pressed to get to the secure home screen 208 and terminate operation of any other applications that are executing in the background to prepare for installation of the new application.

At step 3a, the secure installer may request a package list of the application from the controller domain 206. At step 3b, the controller domain 206 may request the package list from the storage medium 212 in the untrusted domain 204. At step 3c, the storage medium 212 in the untrusted domain 204 may provide the package list for the application back to the controller domain 206. At step 3d, the controller domain 206 may provide the package list for the application to the secure installer 210 in the trusted domain 204.

At step 4, the user may select an application from a list of apps. The secure installer 210 may receive the application that is selected from the user.

At step 5a, the secure installer 210 in the trusted domain 202 may request the application resources for the selected application from the controller domain 206. In one embodiment, specifically in an Android® implementation, the application resources may include an application package file (APK) file associated with the application and public keys associated with the application. In one embodiment, the APK file and the public key may be used during the launch and execution of the application, as discussed in further detail below in FIG. 3.

At step 5b, the controller domain 206 may request the application resources for the selected application from the storage medium 212 in the untrusted domain 204. At step 5c, the storage medium 212 in the untrusted domain 204 may send the application resources for the selected application to the controller domain 206. In one embodiment, a copy of the application resources may be stored in the secure storage medium 216 of the controller domain 206 as illustrated by the secured application resources 218. At this point, the secure installer 210 may install the requested application using the secured application resources 218 from the controller domain 206 and the method ends.

It should be noted that the untrusted domain 204 does not participate in the installation process. Rather, the controller domain 206 directly accesses a memory containing the installation instructions (e.g., a secure digital (SD) card) without relying on the integrity of the untrusted domain 204. Thus, assuming that the user is attempting to install a secure application (i.e., the user is not attempting to hack their own mobile endpoint device 108), the installation of the application on the mobile endpoint device 108 is likely to be secure.

Figure 3:
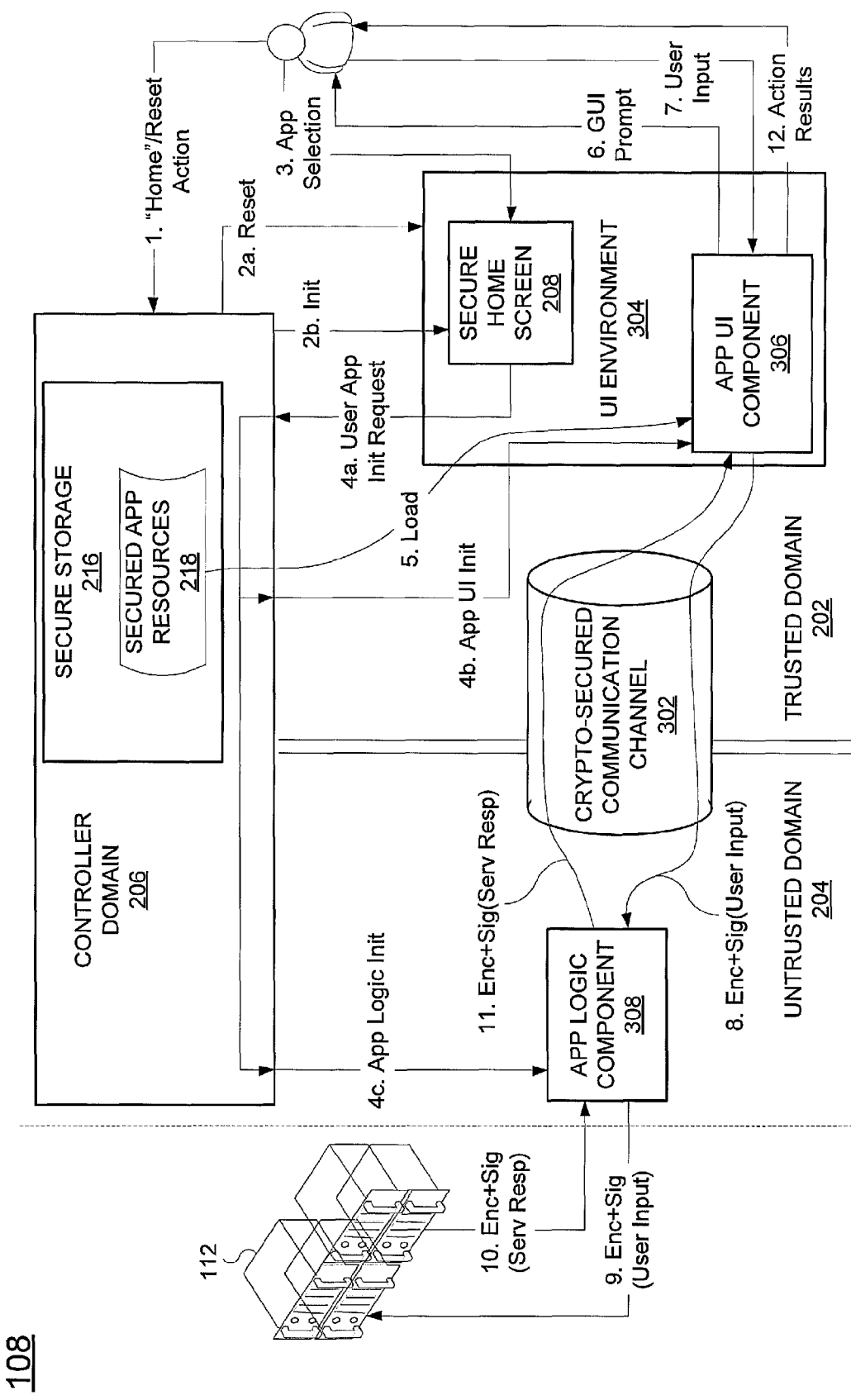
FIG. 3 illustrates an example flowchart of one embodiment of a method for securing user input and output on a mobile endpoint device.

FIG. 3 illustrates a flowchart of a method for one embodiment of securing user input and output on a mobile endpoint device. In one embodiment, one or more operations of the method 300 may be performed by the endpoint device 108 (e.g., a processor of the mobile endpoint device) or a general purpose computing device as illustrated in FIG. 4 and discussed below.

FIG. 3 illustrates the division of the mobile endpoint device 108 into the different domains described above in FIG. 2. For example, the mobile endpoint device 108 may include the trusted domain 202, the controller domain 206 and the untrusted domain 204.

Once the application is installed onto the mobile endpoint device 108, the application may attempt to communicate with a third party server 112, for example a server of a banking web site. Sensitive information, for example bank account balances, bank account numbers, passwords, usernames, and the like, may be exchanged between the mobile endpoint device 108 and the third party server 112 during communications. As discussed above, if a hacker obtains complete control of the mobile endpoint device 108, the hacker may easily monitor the input at the user interface of the mobile endpoint device 108 to capture sensitive inputs and outputs exchanged between the mobile endpoint device 108 and the third party server 112. The method described and illustrated in FIG. 3 provides one method of ensuring secure user input and output on the mobile endpoint device 108.

The method begins at step 1 where a user presses a "home" button or initiates a reset action on the mobile endpoint device 108. At step 2a, the controller domain 206 resets the UI environment 304 located in the trusted domain 202. For example, any applications that may be running in the background in the trusted domain 202 of the mobile endpoint device 108 may be terminated. In one embodiment, this ensures that if another application on the mobile endpoint device 108 is hacked that the hacked application cannot obtain control of or access to any other secured application. At step 2b, the controller domain 206 initializes the secure home screen 208 of UI environment 304 in the trusted domain 202.

At step 3, the user selects an application. At step 4a, the secure home screen 208 sends a user application initialization request to the controller domain 206. The controller domain 206 may then send the application UI initialization information to the application UI component 306 in the UI environment 304 in the trusted domain 202 at step 4b. At step 4c, the controller domain 206 initializes the application logic component 308 such that it may be ready to communicate.

At step 5, the controller domain 206 may send the secured application resources 218 to the application UI component 306 to run the UI of the selected application. In one embodiment, the application UI component 306 may be executed by an application that copies the UI of the application in the trusted domain 202. For example, one type of such application that can be used is the Mimic application.

In one embodiment, all application code and logic besides the UI of the application may execute in the untrusted domain 204 within the normal instance of the application. For example, the secured application resources 218 may include a package name and a layout of the application the Mimic application will be mimicking. The Mimic application may then exchange messages, through a formally verified secure channel, with the logic portion of the application in the untrusted domain 204 whenever a command is received from a user.

In one embodiment, the secured application resources 218 may include the public key and the application layout stored from the method described in FIG. 2. In one embodiment, session keys may include a message authentication code (MAC) key and an encryption key. The MAC key may be used to generate and verify MACs to authenticate that data being sent between the mobile endpoint device 108 and the third party server 112 are from the correct source. The encryption key may be used to encrypt and decrypt encrypted data that is sent between the mobile endpoint device 108 and the third party server 112.

At step 6, the application UI component 306 may send a graphical user interface (GUI) prompt to the user. For example, the GUI may prompt the user to enter a username and password for accessing the sensitive information stored on the third party server 112. At step 7, the user provides an input to the application UI component 306, e.g., the user's username and password.

At step 8, the application UI component 306 may encrypt and authenticate (e.g., via the MAC) the input received from the user at step 7 and transmit the input over a secured communication channel 302 to the application logic component in the untrusted domain 204. In one embodiment, the secure communication channel 302 is created using a single shared memory page.

In one embodiment, the isolation layer may provide built-in support for inter domain communication. This can be used to establish a secure communication channel 302 between the UI domain and the untrusted domain 204. In a Xen specific implementation, a grant table can be used to obtain a shared 4 kilobyte (KB) page of memory. When the UI component of an application first starts, it can initiate the creation of the secure channel. In the case of Xen, the shared memory page must be initialized through Xen's grant table application programming interface (API). Xen identifies this shared memory page using a grant reference number, which must be passed to the untrusted domain 204 in order to map this shared page for communication.

In one embodiment, the grant reference number is passed to the untrusted domain 204 using a normal user datagram protocol (UDP) socket. No response is received from the untrusted domain 204 in order to maintain security of the system. Once the untrusted domain 204 receives the grant reference number, using the same API, it maps the shared memory page into its own address space. At this point the secure communication channel 302 is established and all information passing between the untrusted domain 204 and the trusted domain 202 occurs over this channel.

In one embodiment, a formally verified library, written in C for example, may be used to interact with the shared memory page for secure communications between the trusted domain 202 and the untrusted domain 204. The library may contain functions used to read and write to the shared channel both from the trusted domain 202 and the untrusted domain 204. The write function may write some specified data to the shared memory page and set various flags to notify the opposite side that there is data to read. After the data is read, the flags and the data may be cleared and the channel can be used again. In this way, only one message can be sent between each side at a time and a message must be read before another message can be sent. In one embodiment, a spinlock mechanism may be used on the shared memory page to ensure that every read and write is a truly atomic operation.

Due to control data, only a fixed number of bytes can fit on a shared page. In other words, each message that is sent over the secure channel must fit within a fixed amount of memory. In one embodiment, the message must fit within approximately 3096 bytes of memory. To ensure that no application can write past this boundary, the bounds are checked for every write. In addition, reads are placed into a properly sized buffer.

In one embodiment, the input may be encrypted and signed using the encryption key and the signature key for the session before being transmitted over the secure communication channel 302. In one embodiment, encryption may be done via "piping" the secure user input directly from the UI environment 304 in the trusted domain 202 into the secured communication channel 302. For example, the application may issue a command of the form:

write_to_tunnel("Password="+get_secure_field_value
(PASSWORD))

In the example above, PASSWORD is a unique identifier of the password field in the UI environment 304. The function "get_secure_field_value" never returns the field value to the caller. Instead, it returns a handle that the function "write_to_tunnel," executed in the trusted domain 202, can use to retrieve the value of the user entered password. Consequently, the result of the above call is that the string "Password=pass" is written to the secure communication channel 302, where "pass" is the user entered password. Since the secure communication channel 302 end point is in the trusted domain 202, the password never passes unencrypted through the untrusted domain 204.

At step 9, the encrypted and signed user input is sent from the application logic component 308 in the untrusted domain 204 to the third party server 112. The third party server 112 may then decrypt the user input using a session key. In one embodiment the session key may include a block cipher key and a message authentication code (MAC) key.

At step 10, the third party server 112 may then send a response back to the mobile endpoint device 108, for example requested bank account information. In one embodiment, the encrypted and signed response is received at the mobile endpoint device by the application logic component 308 in the untrusted domain 204.

The third party server 112 may encrypt and sign the response before transmitting the response to the mobile endpoint device 108. In one embodiment, the encrypted and unencrypted parts of the response from the third party server 112 may be separated by a delimiter. Each application may define a delimiter "DELIM," which may be specified as part of the installation procedure described in FIG. 2 above and signed by the public key of the application. Any information sent from the third party server 112 may be split according to the specified delimiter and content between every two delimiters may be considered to be sensitive. For example, if the delimiter is "#" and the response is bank account information such as a password and account balance, then in the transmission:

Login: Alice; Password: #12345#; Account balance:
$100#, the strings "12345" and "$100" would be identified as being sensitive, while the rest of the data may be considered as being non-sensitive. The trusted domain 202 may then process the incoming data from the third party server 112 by storing each sensitive string locally and replacing it with a handle before forwarding it to the untrusted domain 204. In the above example, the application running in the untrusted domain 204 would receive the following text:

Login: Alice; Password: [handle 1]; Account balance: [handle 2]

The application may then use handle 1 and handle 2 in future calls to the trusted domain 202.

At step 11, the application logic component 308 may send the encrypted and signed response over the secure communication channel 302 to the application UI component 306 in the trusted domain 202. The application UI component 306 may then decrypt the encrypted and signed response using the appropriate handles discussed above and appropriate session keys. At step 12, the results may be displayed to the user in the secure UI environment 304 in the trusted domain 202.

It should be noted that in the method described above in reference to FIG. 3 that the untrusted domain 204 and the trusted domain 202 only communicate over the secured communication channel 302. In addition, no data from the trusted domain 202 goes to the untrusted domain 204 without encryption. As a result, a hacker who may have gained control over the mobile endpoint device 108 may still not be able to obtain sensitive information by monitoring the user's inputs and outputs. The logical component of an application is separated from the user interface components of the application and all user inputs and outputs are encrypted before being passed to the logical component of the application. As a result, the embodiments of the present disclosure secure a user's inputs and outputs on a mobile endpoint device.

It should be noted that although not explicitly specified, one or more steps of the methods described above may include a storing, displaying and/or outputting step as required for a particular application. In other words, any data, records, fields, and/or intermediate results discussed in the methods can be stored, displayed, and/or outputted to another device as required for a particular application. Furthermore, operations, steps or blocks in FIGS. 2 and 3 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

FIG. 4 depicts a high-level block diagram of a general-purpose computer suitable for use in performing the functions described herein. As depicted in FIG. 4, the system 400 comprises a hardware processor element 402 (e.g., a CPU), a memory 404, e.g., random access memory (RAM) and/or read only memory (ROM), a module 405 for securing user input and output on a mobile endpoint device, and various input/output devices 406, e.g., near field communications capability, an accelerometer, a gyro, a camera, a light sensor, a microphone, a compass, pressure sensor, a temperature sensor, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the operations or steps of the above disclosed method. In one embodiment, the present module or process 405 for securing user input and output on a mobile endpoint device can be implemented as computer-executable instructions (e.g., a software program comprising computer-executable instructions) and loaded into memory 404 and executed by hardware processor 402 to implement the functions as discussed above. As such, the present method 405 for providing security on a mobile endpoint device as discussed above in the various methods (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A mobile endpoint device for securing a user input, the mobile endpoint device comprising:
   a processor; and
   a computer-readable medium storing a plurality of instructions which, when executed by the processor, cause the processor to perform operations, the operations comprising:
      receiving the user input on the mobile endpoint device;
      encrypting and authenticating the user input in a trusted domain of the mobile endpoint device executing an application; and
      sending the user input that is encrypted and authenticated to an untrusted domain of the mobile endpoint device over a secure channel, wherein the trusted domain comprises a user interface portion of the application for securing the user input, wherein the untrusted domain comprises a logical portion of the application.

2. The mobile endpoint device of claim 1, wherein the encrypting comprises using a session key that is generated each time the application is started.

3. The mobile endpoint device of claim 2, wherein the session key comprises a message authentication code component and an encryption component.

4. The mobile endpoint device of claim 1, wherein the user input that is sent over the secure channel fits within a fixed amount of memory.

5. The mobile endpoint device of claim 1, wherein the secure channel relies on an inter domain communication mechanism supplied by an isolation layer.

6. A non-transitory computer-readable medium storing a plurality of instructions which, when executed by a processor of a mobile endpoint device, cause the processor to perform operations for securing a user output on the mobile endpoint device, the operations comprising:
   receiving data in an untrusted domain of the mobile endpoint device that is executing an application;
   sending the data to a trusted domain of the mobile endpoint device executing the application over a secure channel, wherein the trusted domain comprises a user interface portion of the application for securing the user output, wherein the untrusted domain comprises a logical portion of the application;
   decrypting and authenticating the data in the trusted domain of the mobile endpoint device executing the application; and
   displaying the data as the user output on a display of the mobile endpoint device.

7. The non-transitory computer-readable medium of claim 6, wherein the decrypting comprises using a delimiter to identify a portion of the data that is sensitive.

8. The non-transitory computer-readable medium of claim 7, wherein the decrypting comprises replacing the portion of the data that is identified as being sensitive with a handle.

9. The non-transitory computer-readable medium of claim 6, wherein the decrypting comprises using a session key.

10. The non-transitory computer-readable medium of claim 9, wherein the session key comprises a message authentication code component and an encryption component.

11. The non-transitory computer-readable medium of claim 6, wherein the data that is sent over the secure channel fits within a fixed amount of memory.

12. A mobile endpoint device for securing a user output, the mobile endpoint device comprising:
   a processor; and
   a computer-readable medium storing a plurality of instructions which, when executed by the processor, cause the processor to perform operations, the operations comprising:
      receiving data in an untrusted domain of the mobile endpoint device that is executing an application;
      sending the data to a trusted domain of the mobile endpoint device executing the application over a secure channel, wherein the trusted domain comprises a user interface portion of the application for securing the user output, wherein the untrusted domain comprises a logical portion of the application;
      decrypting and authenticating the data in the trusted domain of the mobile endpoint device executing the application; and
      displaying the data as the user output on a display of the mobile endpoint device.

13. The mobile endpoint device of claim 12, wherein the decrypting comprises using a delimiter to identify a portion of the data that is sensitive.

14. The mobile endpoint device of claim 13, wherein the decrypting comprises replacing the portion of the data that is identified as being sensitive with a handle.

15. The mobile endpoint device of claim 12, wherein the decrypting comprises using a session key.

16. The mobile endpoint device of claim 15, wherein the session key comprises a message authentication code component and an encryption component.

17. The mobile endpoint device of claim 12, wherein the data that is sent over the secure channel fits within a fixed amount of memory.

* * * * *